(12) United States Patent
Schmitt et al.

(10) Patent No.: US 8,249,318 B2
(45) Date of Patent: Aug. 21, 2012

(54) METHOD FOR IDENTIFYING IMPLANTED RECONSTRUCTIVE PROSTHETIC DEVICES

(75) Inventors: Mike Schmitt, Billings, MT (US); Troy S. Bergquist, Bozeman, MT (US); Brian Smithgall, Bozeman, MT (US)

(73) Assignee: OsteoWare, Inc., Billings, MT (US)

( * ) Notice: Subject to any disclaimer, the term of this patent is extended or adjusted under 35 U.S.C. 154(b) by 927 days.

(21) Appl. No.: 12/239,531

(22) Filed: Sep. 26, 2008

(65) Prior Publication Data

US 2010/0080426 A1    Apr. 1, 2010

(51) Int. Cl.
G06K 9/00 (2006.01)
G01B 11/30 (2006.01)
A61B 5/05 (2006.01)

(52) U.S. Cl. ......... 382/128; 128/922; 356/600; 600/348

(58) Field of Classification Search .................. 382/128, 382/131, 132
See application file for complete search history.

(56) References Cited

U.S. PATENT DOCUMENTS

| | | | |
|---|---|---|---|
| 5,306,306 A * | 4/1994 | Bisek et al. ................. | 600/407 |
| 5,610,966 A | 3/1997 | Martell et al. | |
| 6,512,995 B2 | 1/2003 | Murao | |
| 6,674,883 B1 | 1/2004 | Wei et al. | |
| 6,826,316 B2 | 11/2004 | Luo et al. | |
| 7,016,532 B2 | 3/2006 | Boncyk et al. | |
| 7,031,554 B2 | 4/2006 | Iwane | |
| 7,171,060 B2 | 1/2007 | Park et al. | |
| 7,366,340 B1 | 4/2008 | Smithgall | |
| 2002/0106135 A1 | 8/2002 | Iwane | |
| 2002/0118881 A1 | 8/2002 | Choi et al. | |
| 2002/0131641 A1 | 9/2002 | Luo et al. | |
| 2005/0002571 A1 | 1/2005 | Hiraga et al. | |
| 2005/0054917 A1* | 3/2005 | Kitson .......................... | 600/427 |
| 2005/0168460 A1 | 8/2005 | Razdan et al. | |
| 2007/0025606 A1* | 2/2007 | Gholap et al. ................. | 382/128 |
| 2007/0124120 A1 | 5/2007 | Hamazoe | |
| 2007/0130112 A1 | 6/2007 | Lin | |
| 2008/0075348 A1* | 3/2008 | Rappaport et al. ............. | 382/132 |
| 2008/0089566 A1* | 4/2008 | Node-Langlois et al. ..... | 382/128 |

OTHER PUBLICATIONS

Kevin Ong et al.; Projected Economic Burden of Revision THA and TKA for Medicare Enrollees in the Next Decade; Scientific Exhibit No. SE39; February 14, 2007, Exponent.
Steven Kurtz, Ph.D. et al.; The Future Burden of Hip and Knee Revisions; Scientific Exhibit No. SE53; Mar. 22, 2006; Exponent; Chicago, IL.
Integrated Heathcare Association; Orthopedics Data Compendium; Use, Cost, and Market Structure for Total Joint Replacement; Aug. 2006; Oakland, CA. The Association of Bone & Joint Surgeons; Orthopaedic Device Reference; 1998; 1st Edition; Brckenridge Publishing Company; Breckenridge, CO.

* cited by examiner

*Primary Examiner* — Vu Le
*Assistant Examiner* — Kenny Cese
(74) *Attorney, Agent, or Firm* — Antoinette M. Tease (57) ABSTRACT

A method for identifying implanted reconstructive prosthetic devices comprising obtaining a digital radiographic image of a prosthetic implant that has been implanted in a person or animal for which the manufacturer and/or model is unknown; allowing a user to enter into a computer metadata relating to the implant for use as metadata feature values; cleaning up the unknown implant image; rotating, flipping and/or scaling the unknown implant image; extracting features from the unknown implant image according to one or more feature extraction algorithms; and comparing the metadata and extracted feature values for the unknown implant image to feature values for other implant images according to a comparison algorithm to create an overall likelihood score for each of the other implant images.

9 Claims, 9 Drawing Sheets

METHOD FOR IDENTIFYING IMPLANTED RECONSTRUCTIVE PROSTHETIC DEVICES

BACKGROUND OF THE INVENTION

1. Field of the Invention

The present invention relates generally to the field of computer-implemented inventions, and more specifically, to a computer-implemented method for identifying reconstructive prosthetic devices that have been implanted in patients.

2. Description of the Related Art

A need exists within the orthopedic community for a method that will assist orthopedic surgeons and their allied health professionals in the identification of existing total hip, total knee, and total shoulder implants within their patient population. Approximately 2,201,000 primary Total Hip Arthroplasty (THA) procedures and 3,870,000 primary Total Knee Arthroplasty (TKA) procedures were performed in the 14-year period from 1991 through 2004 [1]. During this same time period, it was estimated that 453,000 revision THA procedures and 340,000 revision TKA procedures were completed. Of the cumulative THA procedures, 21% were revisions. Of the cumulative TKA procedures, 8.8% were revisions. A more detailed study completed by Kurtz et al. [2] utilizing this same data calculated the "Revision Burden" for revision THA and TKA procedures to be 17.5% and 8.2%, respectively.

Across the United States, primary THA and TKA patients are walking—or limping—into orthopedic practices because of pain or dysfunction associated with their initial replacements. As the orthopedist reviews the patient's x-rays, MRI, CT-scan, bone scan and patient history, he often finds loose implants, worn polyethylene components, osteolysis (bone loss or bone destruction) and/or malpositioned implants, each of which requires varying degrees of revision surgery. Identification of the implant prior to surgery decreases both patient risk and cost, but this information is not always readily available. For example, the primary procedure may have been performed in Miami, Fla. in 1995 by a surgeon that retired in 1999, and the patient has since relocated to Phoenix. In this situation, the patient's operative record is not easily obtained. Office staff need to make numerous phone calls to the physician's office, the hospital where the surgery was completed, and the patient in order to get some record of which implant was used. Records may exist, but they are on microfiche in storage, and the person answering the phone often has no financial incentive to help.

The reason identification of the initial implant is so important is because there are numerous orthopedic implant manufacturers within the United States and abroad, each with an array of differing implants, and standardization does not exist within the industry. Nearly every implant boasts certain unique design characteristics that purport to make it better than competitive products. If the implant is identified, the necessary implant manufacturer's representative can be contacted and notified of the scheduled surgery, and adequate revision implant components and instruments can then be made available for the surgeon and patient on the day of the surgery. If the implant cannot be identified with certainty, the surgeon will approach the operating room with plans to extract all existing hardware and completely replace all components with new implants. The latter approach poses greater risk of blood loss and fracture, longer anesthesia exposure, and post-operative complications including deep vein thrombosis and pulmonary embolism. In addition to these health risks, this "blind" approach entails excess costs associated with a complete removal of what may be perfectly acceptable components and their replacement with more costly revision components. The actual number of "blind" revision arthroplasties completed annually is unknown but is believed to be substantial.

The most comprehensive resource tool currently available to orthopedists is the *Orthopaedic Device Reference* compiled by the Association of Bone and Joint Surgeons in 1998 [3]. This 253-page guide references implants for total hips, total knees, total shoulders, total elbows, total wrists, total ankles, implantable trauma devices, non-implantable trauma devices. For total hips and total knees, only seven manufacturers are referenced: Biomet, DePuy, Howmedica, Implex, Johnson & Johnson, Smith & Nephew, Zimmer. Since 1998, many of these companies have merged. In addition, many U.S. and European manufacturers were completely omitted from the publication. Each implant has a representative photograph, but no patient x-rays are included in the guide for visualization of the prosthesis once implanted. Furthermore, the reference is in book format, which requires manually leafing through hundreds of pages of implants to find the right one. This reference book is not a practical nor efficient solution to the problem of identifying an existing implant.

As the number of THA and TKA arthroplasties continues to rise annually, the quantity of revision procedures will also continue to rise. The Kurtz study [2] predicts that in 2020, 384,324 primary THAs, 67,607 revision THAs, 1,520,348 primary TKAs and 120,928 revision TKAs will be performed annually. These numbers represent a 70% increase over 2007 projected figures for total (primary and revision) THAs and a nearly 200% increase over 2007 projected figures for total (primary and revision) TKAs [2]. These numbers suggest that the need for a method of accurately identifying implants in patients will only increase.

According to a report by Ong et al. [4], revision THA charges are projected to increase from $0.97 billion to $3.81 billion between 2005 and 2015. Revision TKA charges are projected to increase from $0.75 billion to $4.12 billion [5]. These cost increases may be dramatically reduced if surgeons are able to identify the implants in patients prior to the surgery.

For these reasons, what is needed is a comprehensive orthopedic implant database and software application that will allow orthopedists to accurately identify existing implants utilizing patients' radiographic images. Accordingly, it is an object of the present invention to provide a computer-implemented method that accepts radiographic images of prosthetic devices implanted in patients as inputs and identifies them according to a database of known implantable prosthetic devices in order to assist physicians preparing for device repair or replacement surgery.

BRIEF SUMMARY OF THE INVENTION

The present invention is a method for identifying implanted reconstructive prosthetic devices comprising: obtaining a digital radiographic image of a prosthetic implant that has been implanted in a person or animal for which the manufacturer and/or model is unknown; allowing a user to enter into a computer metadata relating to the implant for use as metadata feature values; cleaning up the unknown implant image by removing extraneous image content, converting the unknown implant image to monochrome, thresholding it, and/or smoothing out any rough edges; rotating, flipping and/or scaling the unknown implant image to a normalized format; extracting features from the unknown implant image according to one or more feature extraction algorithms to generate extracted feature values; comparing the metadata and extracted feature values for the unknown implant image to feature values for other implant images according to a comparison algorithm to create an overall likelihood score for each of the other implant images, wherein such other implant images are stored in a database; and wherein the previous step generates results, displaying the results to a user. In a preferred embodiment, the metadata and extracted feature values are expressed as a feature vector.

In an alternate embodiment, the present invention is a method for identifying implanted reconstructive prosthetic devices comprising: obtaining a digital radiographic image of an prosthetic implant that has been implanted in a person or animal for which the manufacturer and/or model is unknown; cleaning up the unknown implant image by removing extraneous image content, converting the unknown implant image to monochrome, thresholding it, and/or smoothing out any rough edges; rotating, flipping and/or scaling the unknown implant image to a normalized format; extracting features from the unknown implant image according to one or more feature extraction algorithms to generate extracted feature values; comparing the extracted feature values for the unknown implant image to feature values for other implant images according to a comparison algorithm to create an overall likelihood score for each of the other implant images, wherein such other implant images are stored in a database; and wherein the previous step generates results, displaying the results to a user. In a preferred embodiment, the extracted feature values are expressed as a feature vector.

In a preferred embodiment, the comparison algorithm is:

$$\text{Score} = \sum_{j=1}^{N} W_j * f(x'_j - xi_j)$$

wherein j is a feature number; N is a number of features; x' is a feature vector for the unknown implant image; xi is a feature vector for image number i in the database; $W_j$ is a weighting multiplier for feature j; and $f(x'_j - xi_j)$ is a mapping function that maps likelihood of a match between a feature of the unknown implant image and a feature of one of the other implant images.

In a preferred embodiment, the overall likelihood score is displayed to the user as an overall match strength descriptor. Preferably, the results that are displayed to the user include feature match strength descriptors that reflect likelihood of a match between a feature of the unknown image and a feature of one of the other implant images in the database.

In a preferred embodiment, the metadata comprises one or more of the following: date of implantation; implant manufacturer; implanting surgeon name; hospital of implantation; type of surgical procedure; and descriptors that describe a physical aspect of the implant. Preferably, the method further comprises providing the user with an option to include the unknown image and associated metadata and extracted features in the database. In an alternate embodiment, the method further comprises providing the user with an option to include the unknown image and associated extracted features in the database.

In a preferred embodiment, the results displayed to the user include one or more of the following: job information; raw and/or processed radiographic implant images; annotated implant images; feature values; feature match strength descriptors; overall likelihood scores; and overall match strength descriptors. Preferably, one of the extracted features is a match pattern, and a pattern match quality score reflects likelihood of a match between a match pattern of the unknown image and a match pattern of one of the other implant images in the database.

REFERENCE NUMBERS

1 X-ray (film or digital)
2 Scanner
3 Computer
4 Database
5 User display monitor
6 Image capture step
7 Metadata entry step
8 Image cleanup step
9 Image rotation/flipping/scaling step
10 Feature extraction step
11 Identification step
12 User display/acceptance step
13 Database update step
14 Film x-ray
15 Digital x-ray
16 Keyboard
17 Thresholded image
18 Smoothed image
19 Rotated image
20 Flipped image
21 Scaled image
22 Parallel line
23 Edge point
24 Circle
25 First horizontal line
26 Second horizontal line
27 Portion of implant image (unidentified)
28 Known implant image (from database)
29 Identifying text information
30 Best matches table
31 Feature results table

DETAILED DESCRIPTION OF INVENTION

Figure 1:
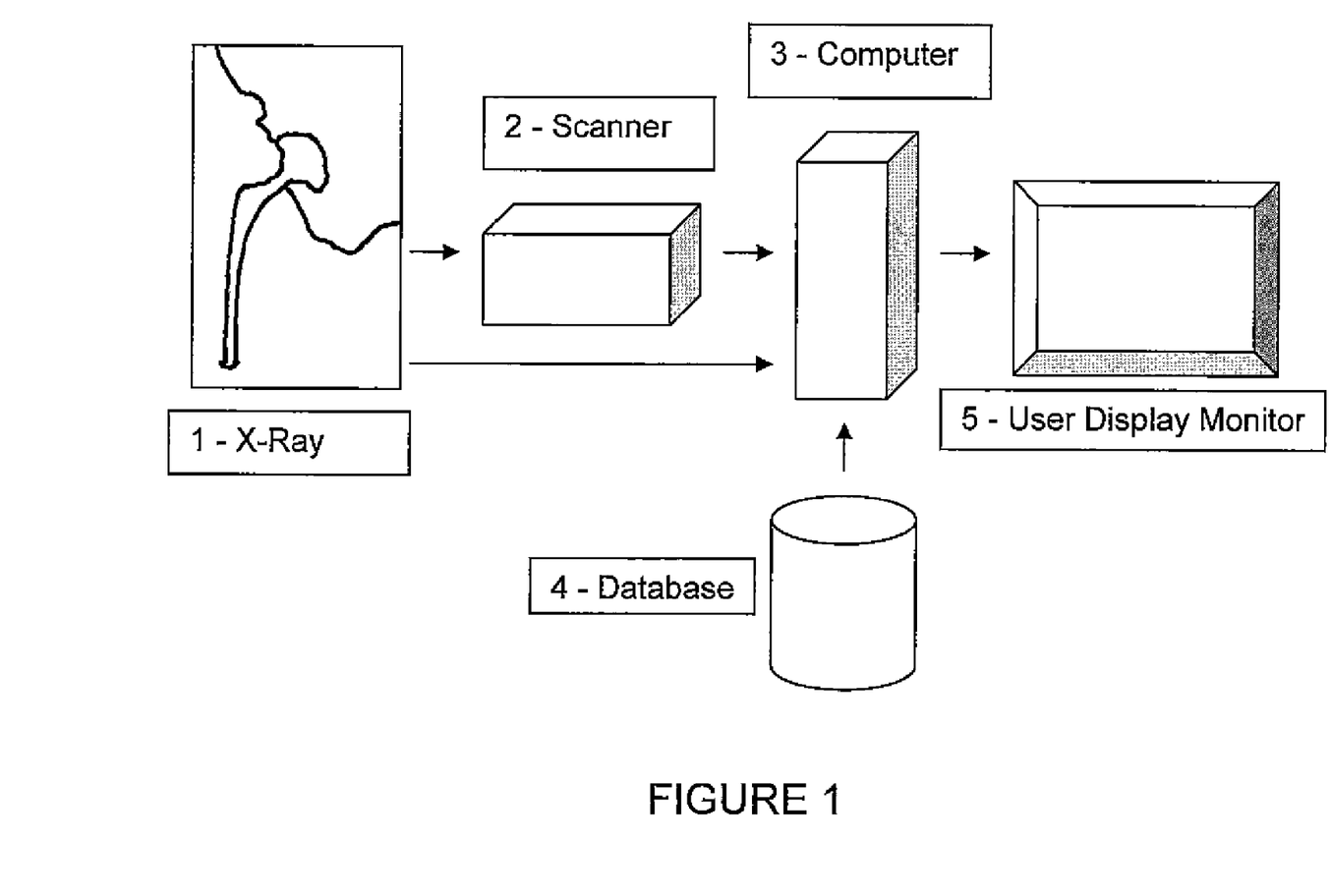
FIG. 1 is a block diagram of the components of the present invention.

FIG. 1 is a block diagram of the system components utilized in connection with the present invention. The overall system components include an x-ray 1 of a prosthetic implant in a person, typically either in film format or newer digital x-ray format, a scanner or other image capture device 2 for converting a film format x-ray to a digital form for processing in a computer, a computer 3 that accepts the digital image input and processes the image according to a feature extraction algorithm and a comparison algorithm. (As used herein, the term "x-ray" encompasses any radiographic image.) The computer 3 is used to compare image sections and features relevant to the image to similar image sections and features stored in a database 4 and to present the results of those comparisons to a user. The computer 3 is also used to update the database 4. The database 4 contains image information and text data (also known as metadata) relevant to the image 1. The present invention further comprises a user interface 5 for image and result display.

Figure 2:
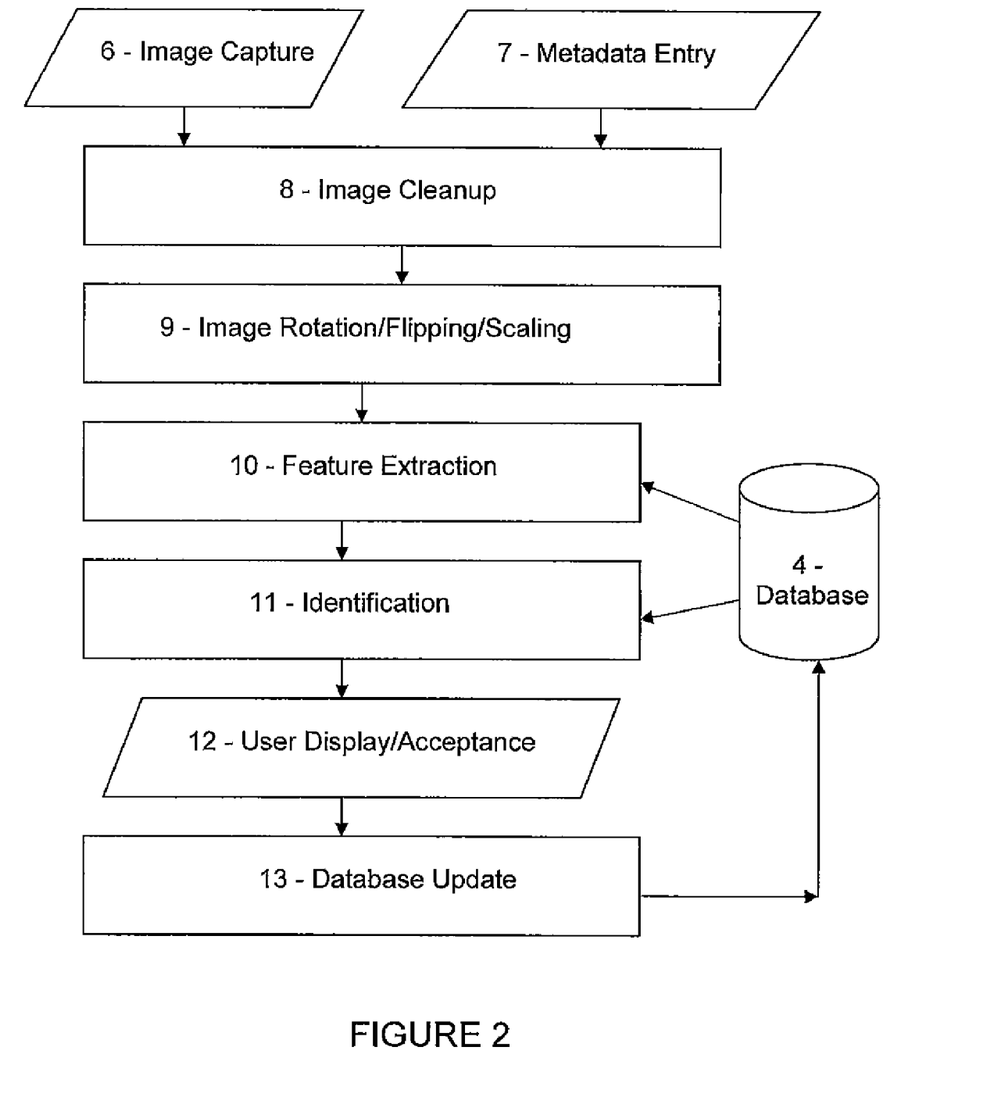
FIG. 2 is a flow diagram of the steps of the present invention.

FIG. 2 is a flow diagram of the steps of the present invention. These steps have different purposes depending on whether the implant model in the image is known or unknown. In the case where the implant model is known, the steps of FIG. 2 are used to create or improve the database. In the case where the manufacturer of the implant is unknown, then the purpose of these steps is to identify the manufacturer and model of the implant and, optionally, add the image to the database once it is identified.

In the image capture step 6, an x-ray (or radiograph) image of a prosthetic implant in a person is obtained. The image is typically obtained by scanning it in from a film format or entering it in digital x-ray format.

In the metadata entry step 7, the user enters information that may be helpful in the identification process (step 11). This information (or metadata) is text information and may include, but is not limited to, the following: date of implantation; implant manufacturer (a patient might know who the manufacturer is but not the make and model); implant name (i.e., make and model); implanting surgeon name; hospital of implantation; type of surgical procedure (e.g., unicondylar, total hip arthroplasty, total knee arthroplasty, total shoulder, hemiarthroplasty); descriptors (e.g., metal-on-metal, rotating platform, resurfacing, ceramic-on-ceramic). These metadata features may be attributes that are visible to a trained x-ray image interpreter but subtly or partially obscured in situ so as to not be picked up automatically by the image processing functions. As explained below, the metadata entered at this stage, if available, may be used as features for purposes of the identification step 11. Any features that may be beneficial for identification purposes (step 11) but are not readily extracted or known from the "normalized" image (steps 9 and 10) are potentially useful metadata.

The next step is the image cleanup step 8. In this step, extraneous image content not relevant to the identification process is removed from the raw image to make it similar in format to the images stored in the database 4. In a preferred embodiment, the database images are binary level, silhouettes of just the implant, showing an outline of the metal shape that is opaque to x-rays. The raw image may be originally in almost any form, including color, showing other body parts such as hip or leg bones and/or showing implant attachment hardware such as pins or wires. In this step, the other body parts and fastening devices (e.g., attachment wires, cement or fastening screws) are removed from the image. The resolution of the image is dealt with in the scaling aspect of the next step.

In the next step 9, the image is rotated, flipped and scaled to a "normalized" format, with the implant in a predictable location, orientation and size. Also in this step, the image format is converted to match the format of the images in the database 4. In a preferred embodiment, the database images are binary level, silhouettes of just the implant, showing an outline of the metal shape that is opaque to x-rays, of a fixed scale of pixels per inch, and stored in an 8-bit BMP file format (which removes color and grayscale).

In the feature extraction step 10, the image is processed according to an algorithm that measures, locates, estimates and/or interprets certain aspects of the image to create "features" that describe the image shape. These features may include the taper ratio, the radius of curvature of sections, the similarity to known shapes, the aspect ratio, the projected volume, and other features such as rotationally invariant moments. These features are extracted using commercially available image processing toolsets, which allow the creation of custom measurement tools. These custom measurement tools are used to extract information about certain differences between the various implant models being considered. The feature extraction step 10 may utilize image subsections called "match patterns" stored in the database 4 of unique or identifying partial silhouette shapes from known implant models (these image sections are different than the raw or processed images that are used in the population of the database). The output of the feature extraction step 10 is a list of feature values, which are added to the textual metadata features, if any, and together expressed typically as a vector of numbers corresponding to dimensions in multivariate feature space.

In the identification step 11, the feature vector generated in the feature extraction step 10 is compared to the feature vectors stored in the database 4 according to a comparison algorithm. The result of this step is a list of possible known implant models and their likelihood of matching the implant on the x-ray image. These results are displayed to the user in the next step 12, along with appropriate contextual information, such as the image itself and certain feature match strengths (see FIG. 8).

The user will view the results, interpret them and make the final decision as to which of the possible known implants is most likely the best match for the prosthetic device in the patient. If the user decides the match is appropriate and desires to include this new information in the database, then the database can be updated in the next step 13. In this step, the features and image content assessed in the previous steps are incorporated into the database 4. The decision whether to include the new information in the database is usually made by a skilled operator who takes into consideration whether the new data will enhance future decisions. (As used herein, the term "skilled operator" means someone who is familiar with imaging systems, images of orthopedic implants, image processing techniques, feature extraction algorithms, and the comparison algorithm(s) used in connection with the present invention.) Specifically, if the identification process has relatively low confidence (i.e., the overall likelihood score is relatively low), then the skilled operator may conclude that it is not appropriate to include the new data in the database. If, however, the model is new or the new data captures some view or image attribute (such as a unique perimeter corner or tip) not readily seen before but likely to be seen again, and if the identification process has relatively high confidence (i.e., the overall likelihood score is relatively high), then the skilled operator may conclude that it would be useful to include the new data in the database.

The database update step 13 may also include the creation of new features, which may help discriminate future images. This would require skilled operator involvement to identify the new feature and a method for extracting (or calculating) it, as described below. If a new feature is to be added to the database, then the new feature must be calculated for all of the prior images stored in the database, and those additional feature values for each image are updated in all of the corresponding feature vectors. This process of adding appropriate known images and features into the database and/or creating new features is the method by which the database is populated.

The features that are to be included in the database are established by a skilled operator as being useful for discerning between various implant models and are defined as part of the feature extraction process, which relates to the "extraction" of features from an image. (The metadata entered at step 7 is also considered a "feature," but it is not part of the feature extraction process.) The extracted features are then extracted from the image as in step 10.

The extracted features are then compared to the existing feature vectors in the database as in step 11 and displayed to the user as in step 12. If another image of the model has already been processed and stored in the database, then the user would expect that the best match would be that model, and that model would have a high confidence (as shown by its high overall likelihood score). If the model has not been processed and stored in the database, then the user would expect that the best match would have a low confidence (as shown by its low overall likelihood score). If either of these cases is true, then the user would "accept" the image and store the image and its associated feature vector in the database. The user would not accept the image and feature data and store it in the database if the result were unexpected. In the case of unexpected results, a skilled operator would typically adjust the features, mapping functions and/or weighting values to achieve an expected result.

The database 4 is a collection of:
 (a) raw and processed images of implants;
 (b) feature values for those images, including both extracted features and entered (textual) metadata;
 (c) image subsections called "match patterns" that are used in the feature extraction and identification steps for determination of the final results;
 (d) mapping functions (described below) for determining the feature match strength for each feature; and
 (e) weighting functions (described below) for determining the overall likelihood score for each known implant model.
Item (a) is updated when a new image is "accepted." Item (b) is updated when either a new image is "accepted" or the features are altered. Items (c), (d) and (e) are updated when new features are added to the database.

Figure 3:
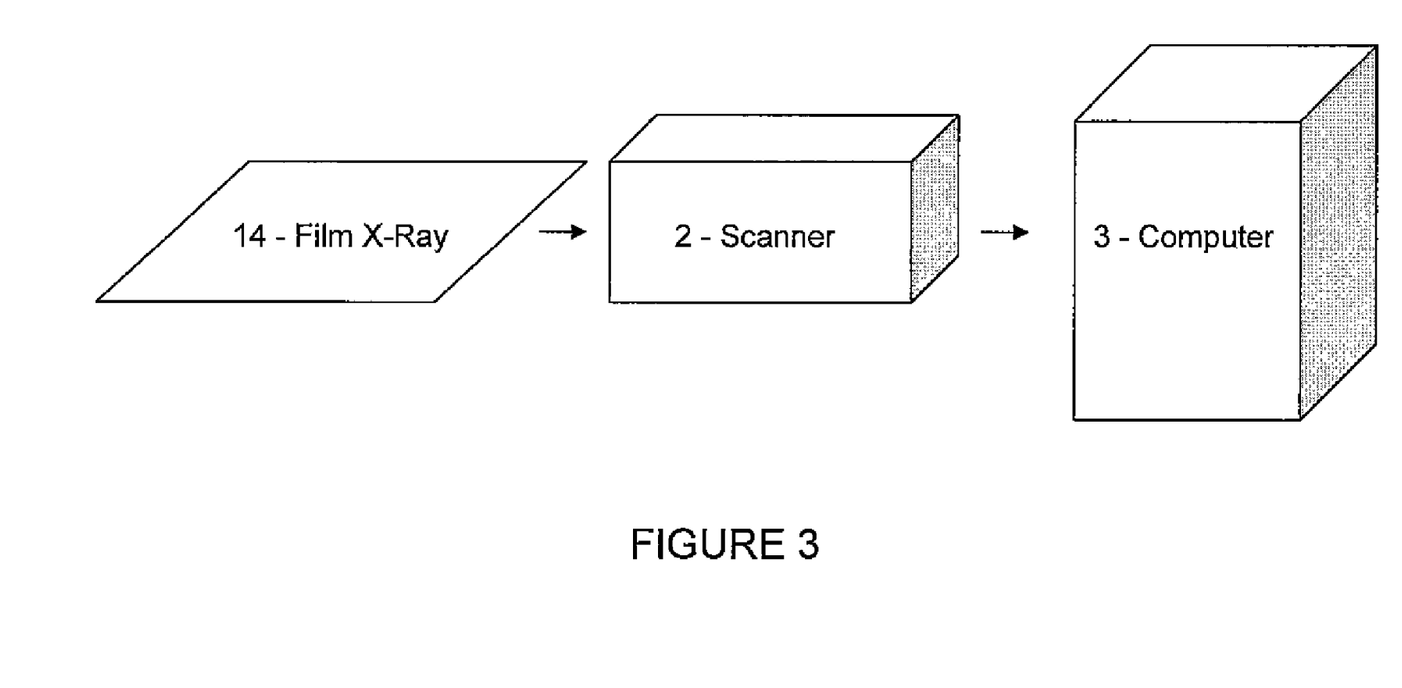
FIG. 3 is a block diagram of the image capture step of the present invention.

FIG. 3 is a block diagram of the film-based image capture step of the present invention (step 6 of FIG. 2). In this step, a user takes an existing x-ray film 14 of a prosthetic implant and scans or images it 2 to create a digital image of the film content. This image is then transferred to a computer 3. The scanning process must preserve the image detail of the x-ray implant section in order for the present invention to work.

Figure 4:
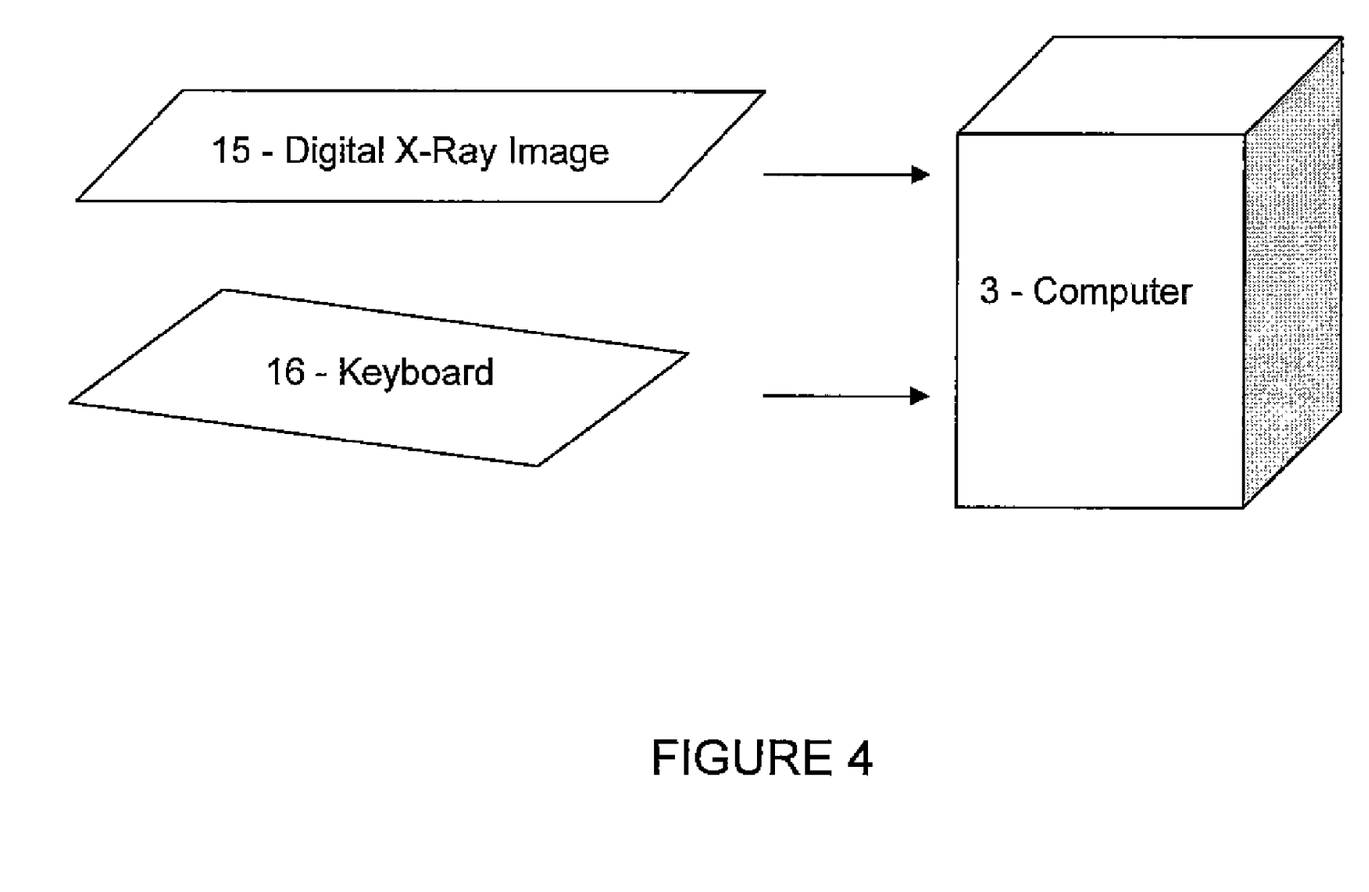
FIG. 4 is a block diagram of the metadata entry step of the present invention.

FIG. 4 is a block diagram of the metadata entry step of the present invention (step 7 of FIG. 2). In this step, a user takes an existing digital x-ray image 14 that has been obtained from either a film x-ray of a prosthetic implant (as described in connection with FIG. 3) or a digital x-ray camera and enters it into a computer 3. The user also takes any associated metadata (i.e., information about the implant or the implant surgery) as obtained from the doctor or patient and enters this information in text form via a keyboard 16 into the computer 3 for storage in the database 4. In a preferred embodiment, the user views the implant image 15 and reviews it for certain known useful features that may be too subtle for an automated processing algorithm to detect and enters this text via the keyboard 16 into the computer 3 for storage in the database 4. For example if the user were able to observe that the implant has a porous sleeve, which may appear in the x-ray, he or she could include this fact as metadata associated with the image. As used herein, the term "metadata" means any descriptive data that is not readily available from the image that may be useful in discriminating between various models of implants.

Figure 5:
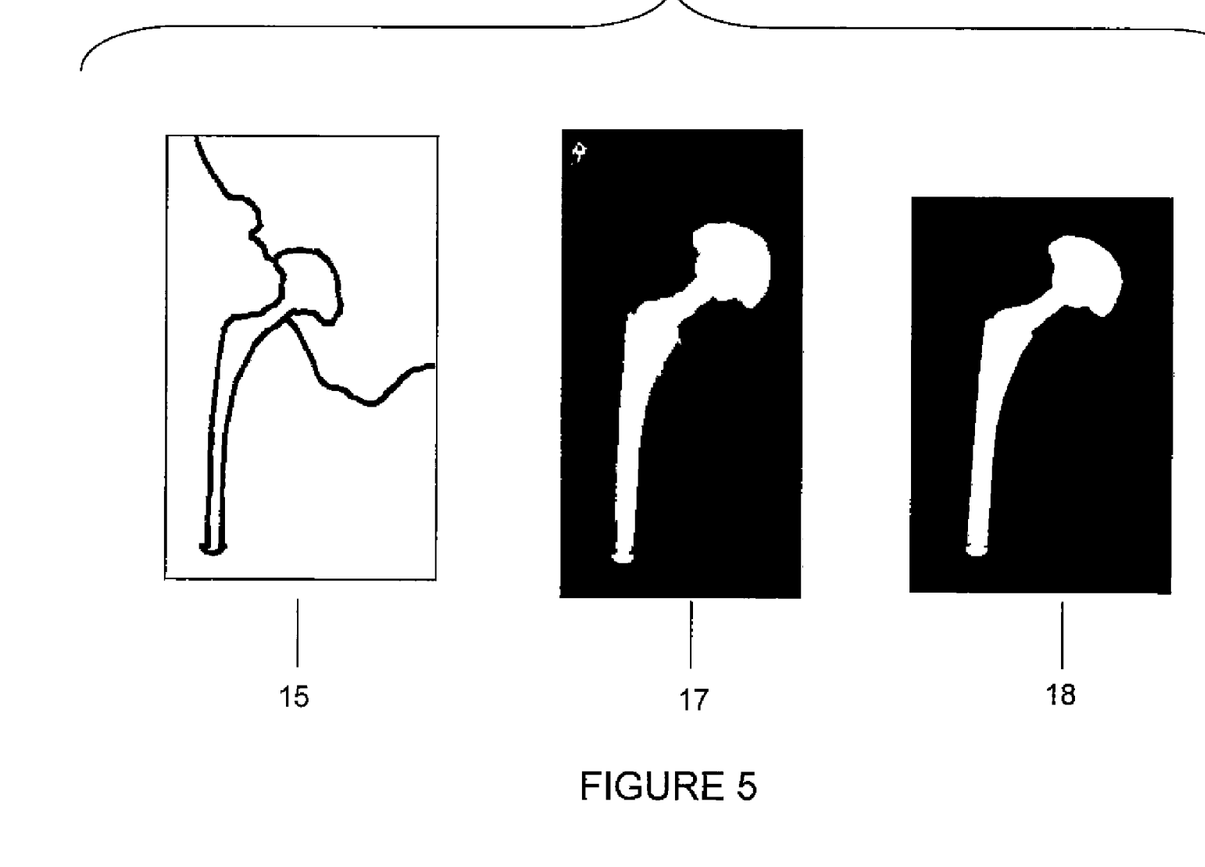
FIG. 5 is an illustration of the image cleanup step of the present invention.

FIG. 5 is an illustration of the image cleanup step of the present invention (step 8 of FIG. 2). The original (raw) image 15 (which is the input to FIG. 4 or the output of FIG. 3) may be in color, have other body parts in the field of view, or have fastening hardware visible in the x-ray. In this step, the image is converted to monochrome (non-color) and is thresholded 17 to extract the object of interest. (Thresholding is used to create binary images from color or grayscale images.) Next, certain rough edges that are not considered by the user to be representative may be smoothed out using a program like Windows Paint, which allows the setting of individual pixels in the image. (This smoothing might be necessary if the image is undersampled or has contrast variation across it as might be found in a typical x-ray of a person's body.) The resulting image 18 more closely resembles the perimeter of an implant than the original image 15. Note that certain areas are filled in, and the edges are more continuous. The image cleanup step 8 does not alter the image metadata but simply modifies the image itself.

Figure 6:
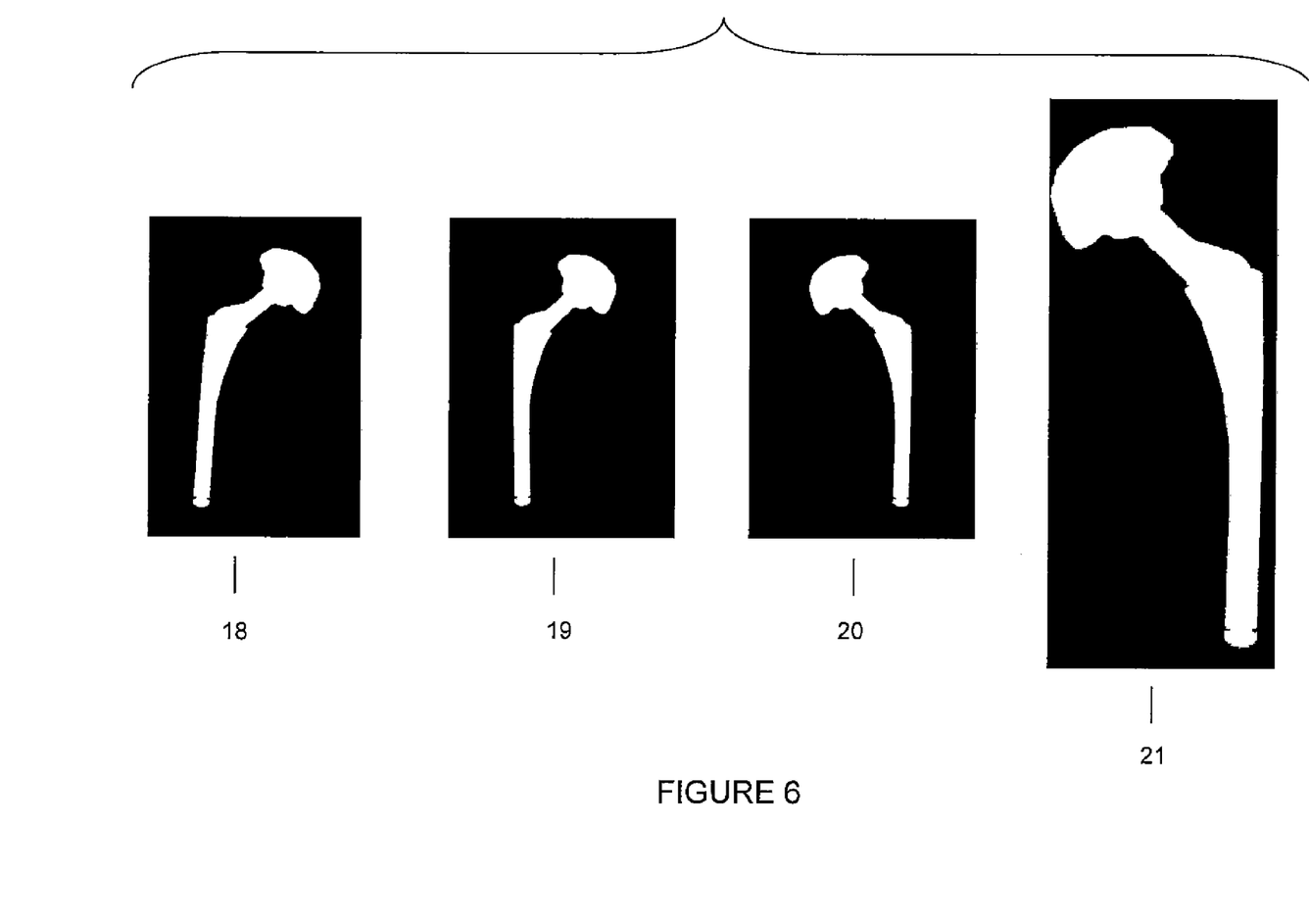
FIG. 6 is an illustration of the image rotation/flipping/scaling step of the present invention.

FIG. 6 is an illustration of the image rotation/flipping/scaling step of the present invention (step 9 of FIG. 2). In this step, the image is rotated, flipped and/or scaled to normalize it to match the images in the database 4. The first image 18 shows the cleaned up image as the input to this step. The second image 19 shows the input image rotated approximately five degrees so that the stem is vertical. The third image 20 shows the image flipped, in this case so that the image matches the orientation of the images in the database. The flipping step is only needed if the shape is from the opposite side of the body as the other images in the database. The last image 21 shows the image scaled to match the size of the images in the database. These steps can be performed in any order. As with the image cleanup step 8, the image rotation/flipping/scaling step 9 does not alter the image metadata but simply modifies the image itself In the feature extraction step (step 10 of FIG. 2), the features of the image are extracted based on the feature algorithm using the custom measurement tools referred to above. The features are designed to measure certain attributes of the object (implant) shape being analyzed.

Figure 7:
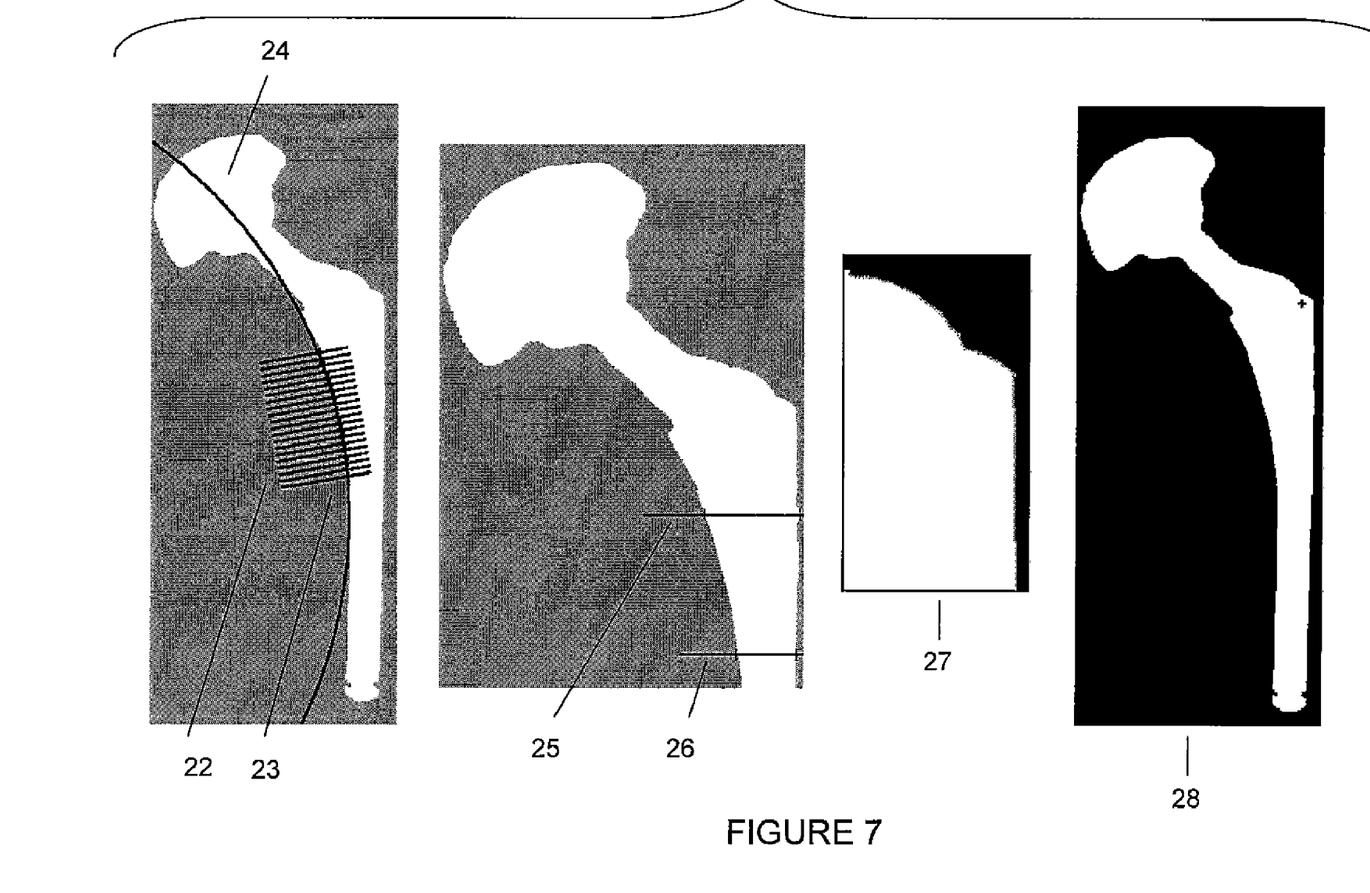
FIG. 7 is an illustration of the feature extraction step of the present invention.

FIG. 7 provides three separate examples of feature extraction. In the first example, the radius of curvature of the left (inner) edge of the implant is measured. This is done by using a series of parallel lines 22 to locate a series of edge points 23 in this area. These edge points are then best fit to a circle 24, and the radius of that circle is determined. This radius becomes the feature value for this attribute. Note that the center of the circle expressed as a coordinate could also be used as a feature.

In the second example, two horizontal lines 25, 26 are projected across the silhouette, and the locations of the edges where the background transitions to the implant shape are found on each side of the silhouette. The distance between each pair of edges represents the width of the horizontal slice across the implant. These distances (in the example, there are two of them) are measured. These measurements could be used as features directly, or their ratio of the upper width to the lower width could be used as a taper feature. In addition, the center of each slice (between each of the two edge points in a pair) could be calculated, and the tilt or relative horizontal displacement between the two center points (one for each horizontal line) could be used as a feature.

In the third example, the shape of a representative shoulder corner on the implant image 27 is shown. (Note that image 27 is a portion of image 21 from FIG. 6.) This shape could be saved as a match pattern in the database, matching techniques could be used to locate the best match of that shape on the image, and the location and match correlation strength could be determined. These matching techniques may include, by way of example but not limitation, correlation, normalized correlation, geometric edge matching and singular value decomposition matching. Techniques such as these can be found in standard image processing packages available today such as DALSA® Coreco Sapera distributed by DALSA Corporation of Waterloo, Ontario, Canada; COMMON VISION BLOX® distributed by the Stemmer Imaging Group of Puchheim, Germany; and OPEN EVISION™ distributed by Euresys Company of Angleur, Belgium. If a good match is found, it will have a high pattern match quality score (often near 100%), and the location and orientation of the best pattern match will be provided. This pattern match quality score could be used as a feature, and the location of the match with respect to the image center may also be used as a feature.

The last image 28 shows a known implant image taken from the database 4 that is the closest match to the implant image 27 from the patient's unidentified implant after matching techniques are utilized. The resultant location of the best pattern match is shown by the cross-hair in image 28.

The feature extraction techniques illustrated in FIG. 7—namely, using edge tools to locate edges, segments to measure features, and pattern matching tools to match portions of the images—are the preferred feature extraction techniques utilized in connection with the present invention, although other feature extraction methods may be used.

The next step in the present invention is the identification step (step 11 of FIG. 2). In this step, the feature values from the feature extraction step are compared to those in the database 4 to create an overall likelihood score for each known implant. Set forth in Table 1 below is an example of what these feature values might look like for two different implants using the simple four-feature example shown in FIG. 7:

TABLE 1

| Feature Description | Implant Model A | Implant Model B |
|---|---|---|
| Radius of curvature | 300 | 10000 |
| Width of top slice | 80 | 60 |
| Width of bottom slice | 60 | 58 |
| Pattern match quality score for trained shoulder pattern | 95% | 55% |

A "feature vector" consists of the set of values found in each column. A feature vector may include extracted features (obtained in step 10) as well as metadata features (entered at step 7).

In a preferred embodiment, this comparison is performed according to the following algorithm (referred to herein as the "comparison" algorithm):

Call the feature measurements vector x' for the sample (the sample is the unknown image):

$$x'_j$$

(The prime indicates it is the sample, and the j subscript indicates the $j^{th}$ attribute out of N attributes.)

Call the feature vector from the database:

$$x[i]_j$$

(The [i] index indicates the $i^{th}$ sample in the database out of M samples.)

Then use a weighted nearest neighbor approach.

The overall likelihood score for sample i given a measurement of x' would be:

$$Score = \sum_{j=1}^{N} W_j * f(x'_j - xi_j)$$

where:

x' is the feature vector for the sample;

xi is the feature vector for the image number i in the database (i.e., an image with a known implant model assigned to each vector);

$W_j$ is a weighting multiplier for an attribute of feature j;

j is the feature number;

N is the number of features; and f( ) is the mapping from feature value difference to class similarity with value on a 0 to 1 scale.

In a preferred embodiment, the mapping function will map small feature differences to values around 1 and significant feature differences to values around 0. With respect to the mapping function, the determination of what constitutes a small or significant feature difference is based on the skilled operator's knowledge of the variability, linearity and range of the particular feature at issue. Other comparison algorithms may be used in connection with the present invention, but the above algorithm represents a preferred embodiment.

A mapping function (f( ) in the above algorithm) is defined to compare the feature values for an attribute. This mapping function preferably maps the likelihood of a feature match from 0 to 1 (100%), where 0 is a poor match and 1 is an excellent match. For example, referring to Table 2 below, the taper attribute could be compared by the difference between the values divided by the expected range of the values, bounded between 0 and 1. Alternately, a Sigmoid function could be used to map the error function non-linearly between 0 and 1. Simpler features like the presence or absence of a hole in the implant may also be compared; a match would be indicated with a 1, and no match would be indicated with a 0. In this manner, individual attributes have functions that map two feature values into a likelihood from 0 to 1. (These feature-specific "likelihood" scores are not the same as the overall likelihood score for the known implant.)

Table 2 shows a simple example of possible database contents of the feature vector for five features for three known implant models. Table 3 shows the feature vector for five features for an unknown sample to be identified.

TABLE 2

| Feature | Implant Model A | Implant Model B | Implant Model C |
|---|---|---|---|
| Taper | 0.7 | 1.0 | .85 |
| Radius | 200 | 250 | 1000 |
| Shoulder Pattern Match Quality Score | 90% | 40% | 95% |
| Hole? (1 = yes, 0 = no) | 1 | 0 | 0 |
| Porosity Present? (1 = yes, 0 = no) | 1 | 1 | 0 |

TABLE 3

| Feature | Unknown Sample |
|---|---|
| Taper | 0.72 |
| Radius | 210 |
| Shoulder Pattern Match Quality Score | 88% |
| Hole? (1 = yes, 0 = no) | 1 |
| Porosity Present? (1 = yes, 0 = no) | 1 |

Referring to Table 2, in the case of the radius feature, one might use a mapping function like:

1−(measured radius−known database radius) divided by (maximum radius−minimum radius)

The measured radius is obtained in the feature extraction step 10, and the minimum and maximum radius values are calculated based on all known radius values in the database.

The taper feature might be handled similarly. For example, the taper feature might be defined as:

Taper feature=width of top slice−width of bottom slice

The mapping function for this taper feature might be:

1−(measured taper−known database taper) divided by (maximum taper−minimum taper)

The maximum and minimum taper are calculated based on all known taper values in the database.

In the case of the pattern matching feature (matching the small shoulder pattern to a portion of the image being analyzed in this example), the mapping function might be:

1−(pattern match quality score for the unknown sample−pattern match quality score from the database)

In the case of the metadata features (that is, hole presence and porosity presence), the mapping function might be:

1 if the features match and 0 if the features do not match

In this manner, the feature value is "1" for a match between the image being analyzed and the known image in the database and "0" for no match between the image being analyzed and the known image in the database.

A weighting function ($W_j$ in the above algorithm) is included to emphasize and attenuate the contribution of each attribute in the final result. For example, it may be known that the hole presence is a reliable attribute, in which case it should have a relatively high weighting (1.0). The shoulder pattern match quality score may be subject to uncertainties due to small edge changes, which might warrant a smaller weighting (0.5). Weight values do not necessarily need to be between 0 and 1, but this may be a convenient standard.

The result of this weighted mapping calculation is an overall likelihood score for the sample [i]. This overall likelihood score may be any value from 0 to a value of the sum of the weights. Alternately, it may be normalized by dividing by the sum of the weights to express the overall likelihood score as a number from 0 to 1. Each overall likelihood score represents a relative level of the unknown sample matching the [i]th sample in the database. The sample with the highest overall likelihood score corresponds to the best match. The overall likelihood scores are calculated for all samples, and they are sorted into an order for presentation to the user.

The individual feature mapping function results for each feature (in other words, the feature-specific "likelihood" scores) may be summarized to a feature match strength descriptor such as "Excellent," "Good" or "Poor," as desired. Similarly, the overall likelihood score for each known implant may also be summarized to an overall match strength descriptor such as "Excellent," "Good" or "Poor," as desired.

As an example, mapping functions might be defined as:

Taper mapping function: $f(e)=1-|e/0.3|$

Radius mapping function: $f(e)=1-|e/800|$

Shoulder match mapping function: $f(e)=1-|e|$

Hole mapping function: $f(e)=1-e$

Porosity mapping function: $f(e)=1-e$ where:

f(e) is the mapping function for feature error e; and e is the difference between the feature value from the sample and the same feature value from the sample being compared from the database. Using the values from Table 3, the mapping functions set forth above, and a uniform weighting function ($W_j=1.0$ for all j where j is the feature number), the overall likelihood score for implant model A for the five features is calculated as follows:

Overall likelihood score for implant model $A=1.0*[1-|(0.7-0.72)/0.3|]+1.0*[1-|(200-210)/800|]+1.0*[1-|0.9-0.88|]+1.0*[1-(1-1)]+1.0*[1-(1-1)]=$ 4.90 approximately (The above equation is based on the formula set forth above on page 19.) Note that in this case, the maximum possible overall likelihood score is 5 (the sum of the weights); therefore, because the overall likelihood score is high, it would have an overall match strength descriptor of "Excellent."

Overall likelihood scores are calculated for all implant models in the database, and the highest score is selected as the best match. The results are displayed in Table 4, along with a feature match strength descriptor that indicates the similarity of the feature values (in other words, the feature match strength descriptor corresponds to the feature-specific "likelihood" scores):

TABLE 4

| Feature | Implant Model A | Unknown Sample | Feature Match Strength |
|---|---|---|---|
| Taper | 0.7 | 0.72 | Excellent |
| Radius | 200 | 210 | Excellent |
| Shoulder Match | 90% | 88% | Excellent |
| Hole? (1 = yes, 0 = no) | 1 | 1 | Excellent |
| Porosity Present? (1 = yes, 0 = no) | 1 | 1 | Excellent |

In theory, a similar table could be generated for implant models B and C, but they would each have a lower overall likelihood score than implant model A (in this case, 2.5 and 1.5, respectively).

Referring again to FIG. 2, after the identification step 11 is performed, the results are displayed to the user in step 12. The display of results to the user may include any or all of the following information:

(a) job information including, but not limited to, identification information (such as doctor name, hospital, hip side, etc.) and x-ray images in raw 15 and processed 21 forms;

(b) annotated images showing algorithm details (such as image 28 with the cross-hair or the left image in FIG. 7 showing annotations 22, 23 and 24);

(c) feature values (for both extracted and metadata features) and/or feature match strength descriptors for the best match (such as shown in Table 4); and (d) overall likelihood scores and/or overall match strength descriptors.

Figure 8:
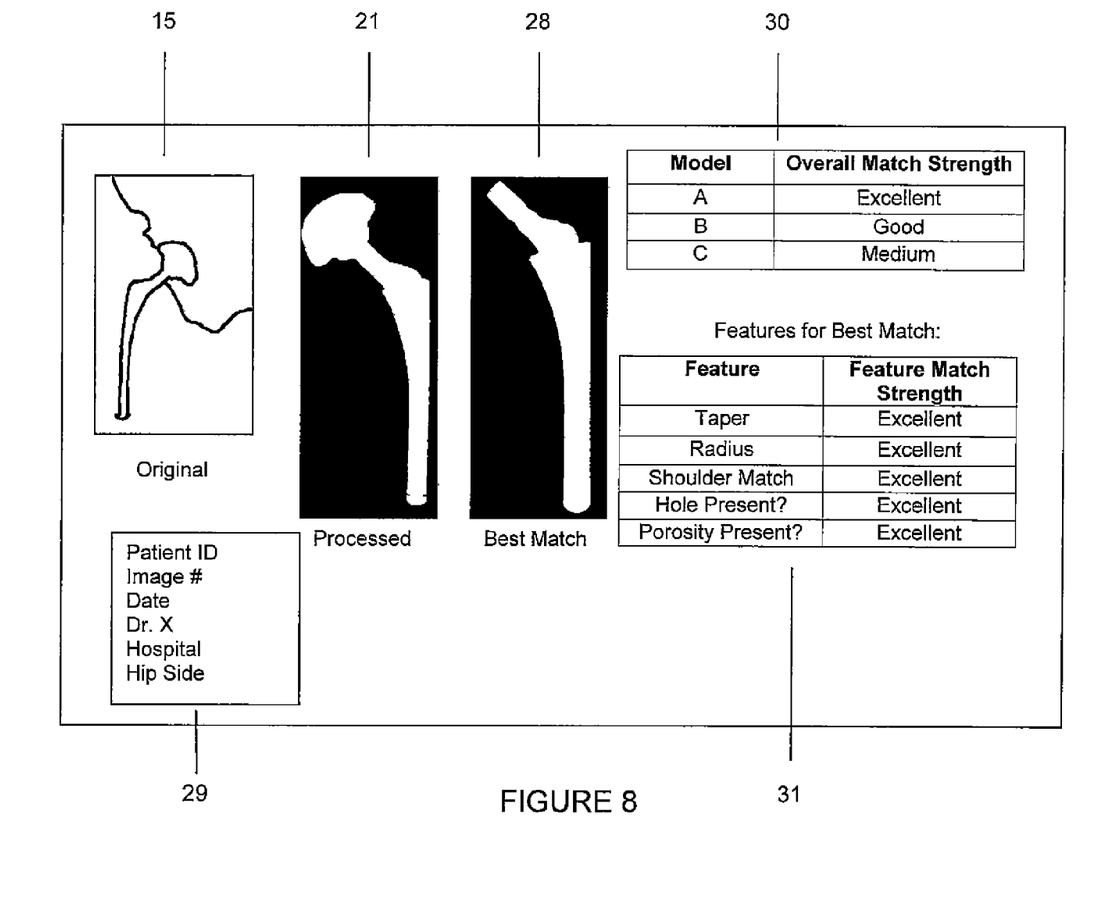
FIG. 8 is an example of a screen shot presenting to the user results generated by the present invention.

In FIG. 8, the information set forth in (a) above is included in the user display, but the information set forth in (b) above is not. Feature match strength descriptors are shown in lieu of actual feature values (or numerical feature-specific "likelihood" scores), and the overall likelihood scores are shown as "Excellent," "Good" and "Medium."

FIG. 8 is an example of a screen shot presenting to the user results generated by the present invention. The display to the user may take many forms, and the present invention is not limited to any particular form or content of the user display. In this example, the user display provides: identifying text information 29; the original image 15; the normalized, processed image 21, optionally with overlays showing feature locations (not shown in FIG. 8); the image of the best match 28; and a list of the top three matches along with their overall likelihood scores 30. The identifying text information 29 is information relating to the current job, such as patient identification number, date, etc.; it is not the metadata that is entered at step 7 (the metadata entered at step 7 appears as one or more features in the feature results table 31). Preferably, the user display also includes a feature match strength descriptor results table 31 that provides a list of the feature match strength descriptors for both extracted features and metadata features for the best match (in this example, Implant Model A) so that the user can determine whether the image was properly interpreted.

In a preferred embodiment, the user has the ability to act on the displayed results, for example, by accepting the best match, selecting another match, and optionally updating the database (or skipping updating the database). Preferably, the user has the option of requesting the involvement of a skilled operator (for example, to add a new feature), printing the results, and sending a report to other parties (such as the patient's doctor).

Referring again to FIG. 2, step 13 is the updating of the database. To create and update the database 4, there are two independent processes involved. (Note that creation of the database is the same as updating an empty database.) The first process involves:

(a) the creation and/or selection of an initial set of features to be calculated on each image (the feature set may include the selection of image subsections for pattern matching);

(b) the establishment of mapping functions for mapping the error between the feature values of a sample image and an image set in the database into a value between 0 and 1; and (c) the determination of weighting values for each feature.

The features sets, mapping functions and weighting values are established by a skilled operator after reviewing the sample images and noting some differences that could be measured easily and used to discriminate between the images. The skilled operator defines feature extraction algorithms using an available image processing toolset that operates on the images to create feature values. The skilled operator also defines questions for the user to define the metadata that will be associated with each image. For example, the skilled operator might decide to measure taper of the part and to have the user indicate whether the image includes a porous shell. Some of these feature extraction algorithms will include sections of images that are to be used for matching (so-called "match patterns") and thus are included in the database for future feature extractions that involve pattern matching. For the set of known images in the database, these algorithms are used to calculate the features and store the feature values in the database together with the raw 15 and processed 21 images.

The second process in updating the database involves the processing of images and storing the resultant feature vectors (i.e., feature values) into the database. If the user determines that the image is a valid image of a known implant model, then the image is included in the database along with its extracted feature values and metadata feature values. If the user is confident about the identification result of a sample, then the sample can be considered a "known" implant model and treated as such with respect to updating the database. As known or unknown images are processed according to the method described above (i.e., steps 6 through 11 of FIG. 2), they are optionally added, together with their feature values, to the database.

Figure 9:
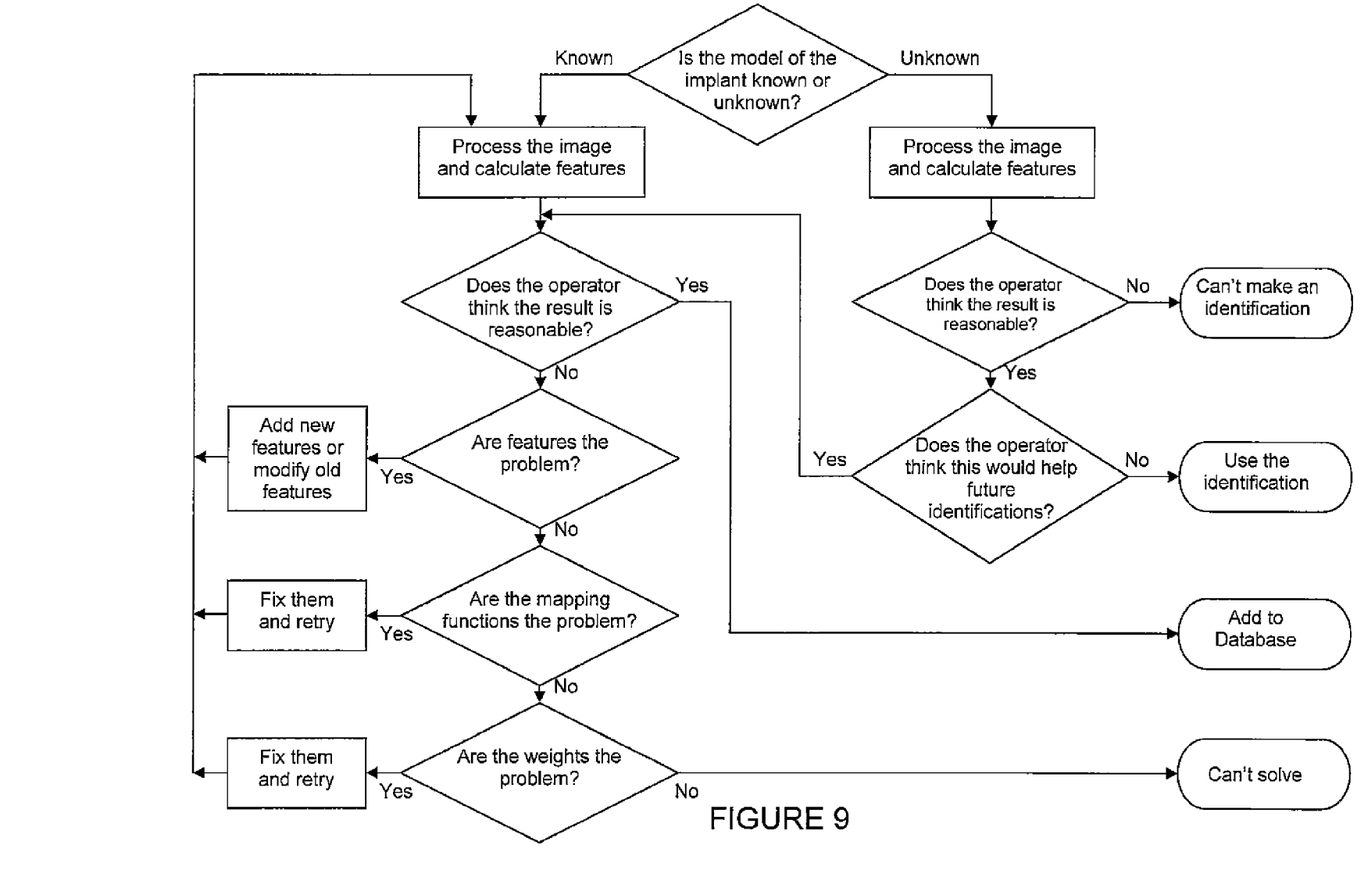
FIG. 9 is a diagram that illustrates the processes described above for identifying unknown images and populating the database with known images.

FIG. 9 is a diagram that illustrates the processes described above for identifying unknown images and populating the database with known images.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

REFERENCES

1. Orthopedics Data Compendium: Use, Cost, and Market Structure for Total Joint Replacement. Oakland, Calif.: Integrated Healthcare Association. August 2006.
2. Kurtz, Steven, Edmund Lau, Ke Zhao, Fionna Mowat, Kevin Ong and Michael Hapern. "The Future Burden of Hip and Knee Revisions: U.S. Projections From 2005 to 2030." Chicago, Ill.: Scientific Exhibit No. SE53 accepted to the $73^{rd}$ Annual Meeting of the American Academy of Orthopaedic Surgeons. Mar. 22-26, 2006.
3. Robert G. Volz, M. D., Editor. The Orthopaedic Device Reference, $1^{st}$ Edition. Breckenridge, Colo.: The Association of Bone & Joint Surgeons. 1998.
4. Ong, Kevin, Fionna Mowat, Edmund Lau, Khald Salch, Jordana Schmier and Steven Kurtz. "Projected Economic Burden of Revision THA and TKA for Medicare Enrollees in the Next Decade." San Diego, Calif.: As part of Scientific Exhibit No. SE39, $74^{th}$ Annual Meeting of the American Academy of Orthopaedic Surgeons. Feb. 14-18, 2007.

We claim:

1. A method for identifying implanted reconstructive prosthetic devices comprising:

(a) obtaining a digital radiographic image of a prosthetic implant that has been implanted in a person or animal for which the manufacturer and/or model is unknown;

(b) allowing a user to enter into a computer metadata relating to identification of the unknown implant for use as metadata feature values;

(c) cleaning up the unknown implant image by removing extraneous image content not relevant to identification of the unknown implant, converting the unknown implant image to monochrome, thresholding it, and/or smoothing out any rough edges;

(d) providing a database of images of implants for which the manufacturer and/or model is known, wherein each of the known images has a format;

(e) rotating, flipping and/or scaling the unknown implant image to a normalized format that matches the format of the images in the database of known implants;

(f) extracting features from the unknown implant image according to one or more feature extraction algorithms to generate extracted feature values, wherein the unknown implant image has a shape, the extracted feature values describe the shape of the unknown implant image, the metadata feature values and the extracted feature values for the unknown implant image are expressed as a feature vector, and the known images stored in the database also have feature vectors;

(g) comparing the feature vector for the unknown implant image to the feature vectors of the known images stored in the database according to a comparison algorithm to create an overall likelihood score for each of the known implant images; and (h) wherein step (g) generates results, displaying the results to a user, wherein the results that are displayed to the user include feature match strength descriptors that reflect likelihood of a match between a feature of the unknown implant image and a feature of one of the known implant images in the database.

2. A method for identifying implanted reconstructive prosthetic devices comprising:

(a) obtaining a digital radiographic image of an prosthetic implant that has been implanted in a person or animal for which the manufacturer and/or model is unknown;

(b) cleaning up the unknown implant image by removing extraneous image content not relevant to identification of the unknown implant, converting the unknown implant image to monochrome, thresholding it, and/or smoothing out any rough edges;

(c) providing a database of images of implants for which the manufacturer and/or model is known, wherein each of the known images has a format;

(d) rotating, flipping and/or scaling the unknown implant image to a normalized format that matches the format of the images in the database of known implants;

(e) extracting features from the unknown implant image according to one or more feature extraction algorithms to generate extracted feature values, wherein the unknown implant image has a shape, the extracted feature values describe the shape of the unknown implant image, the extracted feature values for the unknown implant image are expressed as a feature vector, and the known images stored in the database also have feature vectors;

(f) comparing the feature vector for the unknown implant image to the feature vectors of the known images stored in the database according to a comparison algorithm to create an overall likelihood score for each of the known implant images; and (g) wherein step (f) generates results, displaying the results to a user, wherein the results that are displayed to the user include feature match strength descriptors that reflect likelihood of a match between a feature of the unknown implant image and a feature of one of the known implant images in the database.

3. The method of claim 1 or 2, wherein the comparison algorithm is:

$$\text{Score} = \sum_{j=1}^{N} W_j * f(x'_j - xi_j)$$

wherein j is a feature number;
wherein N is a number of features;
wherein x' is a feature vector for the unknown implant image;
wherein xi is a feature vector for image number i in the database;
wherein $W_j$ is a weighting multiplier for feature j; and
wherein $f(x'_j - xi_j)$ is a mapping function that maps likelihood of a match between a feature of the unknown implant image and a feature of one of the known implant images.

4. The method of claim 1 or 2, wherein the overall likelihood score is displayed to the user as an overall match strength descriptor.

5. The method of claim 1, wherein the metadata comprises one or more of the following: date of implantation; implant manufacturer; implanting surgeon name; hospital of implantation; type of surgical procedure; and descriptors that describe a physical aspect of the implant.

6. The method of claim 1, further comprising:
(h) providing the user with an option to include the unknown implant image and associated metadata and extracted features in the database.

7. The method of claim 2, further comprising:
(g) providing the user with an option to include the unknown implant image and associated extracted features in the database.

8. The method of claim 1 or 2, wherein the results displayed to the user include one or more of the following: job information; raw and/or processed radiographic implant images; annotated implant images; feature values; feature match strength descriptors; overall likelihood scores; and overall match strength descriptors.

9. The method of claim 1 or 2, wherein one of the extracted features is a match pattern, and wherein a pattern match quality score reflects likelihood of a match between a match pattern of the unknown implant image and a match pattern of one of the known implant images in the database.

* * * * *